United States Patent
Ueno et al.

(10) Patent No.: US 8,327,998 B2
(45) Date of Patent: Dec. 11, 2012

(54) METHOD AND AN APPARATUS FOR ALIGNING PIECES OF FOOD DOUGH

(75) Inventors: Sadao Ueno, Utsunomiya (JP); Hitoshi Kuwabara, Utsunomiya (JP); Mikio Narabu, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 0 days.

(21) Appl. No.: 13/095,820

(22) Filed: Apr. 27, 2011

(65) Prior Publication Data

US 2012/0097500 A1    Apr. 26, 2012

(30) Foreign Application Priority Data

Apr. 28, 2010 (JP) ................................ 2010-104140

(51) Int. Cl.
B65G 47/24 (2006.01)
(52) U.S. Cl. ..................... 198/400; 198/419.2; 198/413
(58) Field of Classification Search ............... 198/419.1, 198/400, 413, 416, 411
See application file for complete search history.

(56) References Cited

U.S. PATENT DOCUMENTS

| | | | | |
|---|---|---|---|---|
| 3,342,012 A | * | 9/1967 | Reading ......................... | 198/400 |
| 4,375,348 A | | 3/1983 | Costa | |
| 4,546,870 A | * | 10/1985 | Cogo ............................. | 198/400 |
| 4,593,805 A | * | 6/1986 | Huddle ......................... | 198/381 |
| 6,189,677 B1 | * | 2/2001 | Ruf et al. ..................... | 198/411 |
| 6,338,606 B1 | * | 1/2002 | Bierschenk et al. .......... | 198/406 |

FOREIGN PATENT DOCUMENTS

| | | |
|---|---|---|
| JP | 2567296 | 12/1996 |
| JP | 3009132 | 12/1999 |
| JP | 2007215478 | 8/2007 |

* cited by examiner

*Primary Examiner* — James R Bidwell
(74) *Attorney, Agent, or Firm* — Myers Andras LLP; Joseph C. Andras

(57) ABSTRACT

Disclosed are a method and an apparatus for aligning pieces of food dough that are conveyed downstream by a conveyor so that when aligning members contact the pieces, the deformation of the pieces and the adhesion between the aligning members and the pieces can be reduced.

For the method, the leading edges of the pieces arranged in a plurality of columns that are conveyed downstream by a conveyor 3B are aligned on lines L1, L2 that are perpendicular to the direction that the pieces are conveyed, by using a plurality of aligning members 27 corresponding to the columns of the pieces, wherein the aligning members 27 can reciprocate in the direction to convey the pieces and move up from and down onto the conveyor 3B, wherein while the aligning members 27 are moving downstream at a lower speed than that of the conveyor 3B, the respective aligning members 27 contact the respective leading edges of the pieces of the columns, which pieces are conveyed by the conveyor, and then the aligning members 27 move up and are separated from the pieces.

5 Claims, 9 Drawing Sheets

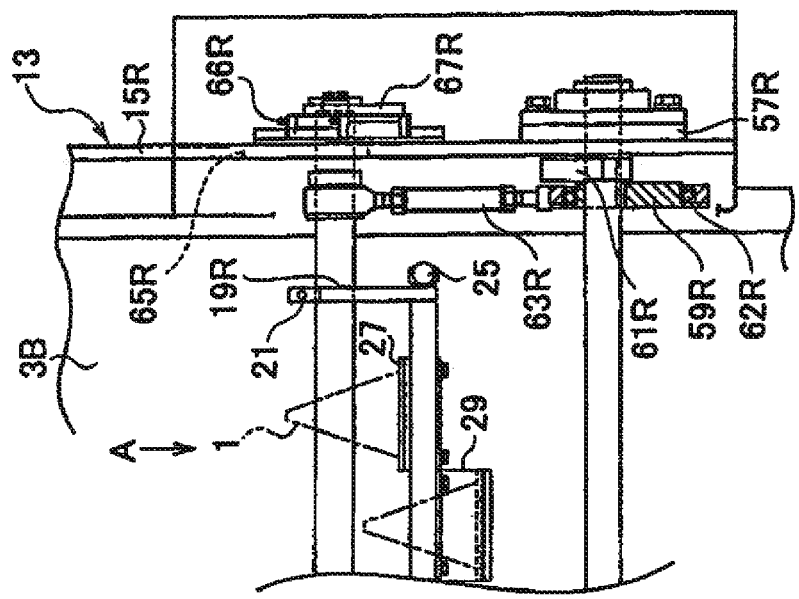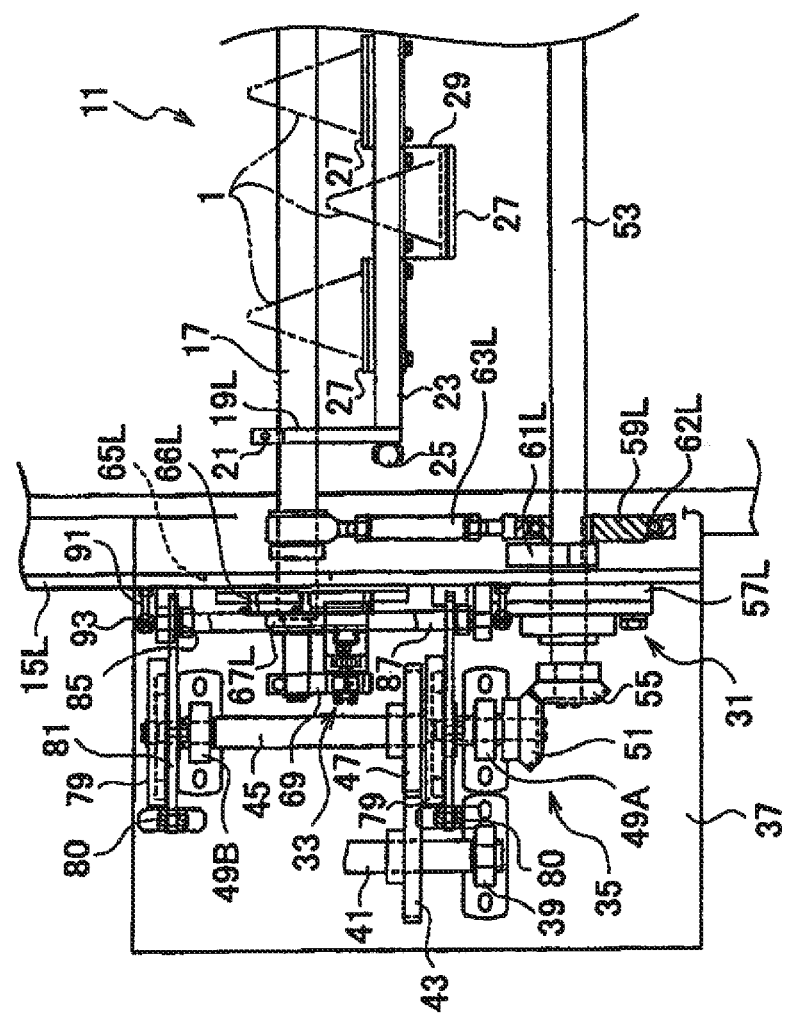
Fig. 3

Fig. 9
(A)
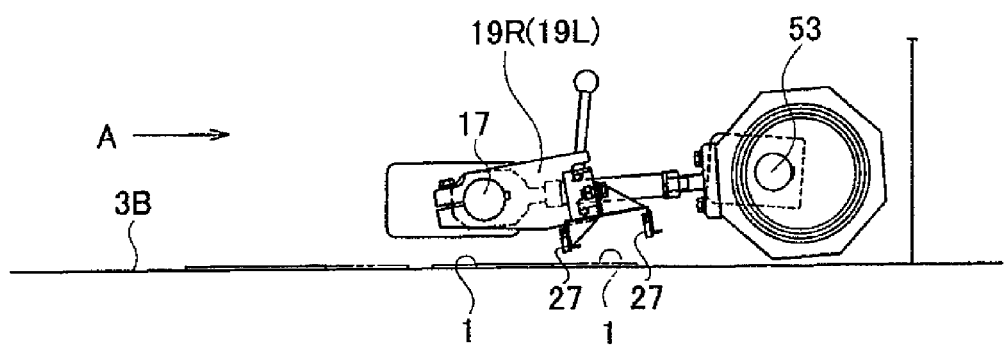
(B)
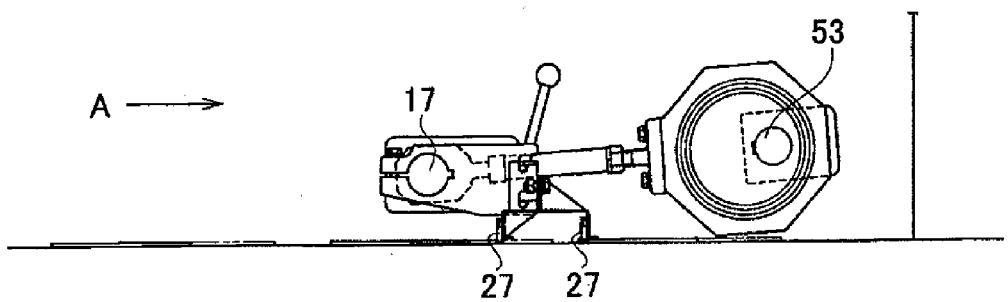

METHOD AND AN APPARATUS FOR ALIGNING PIECES OF FOOD DOUGH

RELATED APPLICATIONS

This application claims priority under 35 U.S.C. 119(e) to Japanese Patent Application No. 2010-104140, filed Apr. 28, 2010.

BACKGROUND OF THE INVENTION

1. Technical Field

This invention relates to a method and an apparatus for aligning a plurality of columns of pieces of food dough that are conveyed downstream by a conveyor so that the leading edges of the pieces are aligned perpendicularly to the direction that the pieces of food dough are conveyed. Particularly, it relates to a method and an apparatus for aligning a plurality of columns of pieces of food dough, which method and apparatus use an aligning member to align the leading edges of the pieces of the food dough by causing the leading edges to contact the aligning member, wherein the leading edges can be prevented from adhering to the aligning member so that when the leading edges are separated from the aligning member, the positions of the pieces of food dough are not disarranged, because the leading edges adhere the aligning member, and wherein the pieces of food dough can be prevented from being deformed when the leading edges of the pieces of the food dough contact the aligning member.

2. Background of the Invention

Pieces of food dough for croissants, for example, are made by cutting a large sheet of food dough into a plurality of pieces having triangular-like shapes and separating them, which sheet is conveyed downstream by a first conveyor. The plurality of pieces having triangular-like shapes are cut and separated from the sheet of the food dough, so that the plurality of pieces of the food dough is arranged along the direction perpendicular to the direction for conveying the sheet of the food dough, and so that the direction connecting the leading edges and the bases of the pieces corresponds to the direction perpendicular to the direction for conveying the sheet.

When a column of pieces having triangular-like shapes are conveyed from the first conveyor to a second conveyor, the pieces are separated from the side of the sheet of the food dough by an apparatus for separating the pieces, and then are rearranged in a staggered pattern.

When the pieces of the food dough are conveyed by the second conveyor, the pieces are rotated so that the bases of the pieces of the food dough having triangular-like shapes turn toward the front, namely, the bases become leading edges. Then the pieces of the food dough are sequentially wound from the bases to the top of the pieces having triangular-like shapes by a winding apparatus disposed at the downstream side of the second conveyor so that the pieces of the food dough for the croissants are formed. (See Patent Document 1, for example.)

Patent Document 1: Japanese Patent No. 2567296

SUMMARY OF THE INVENTION

After the pieces of the food dough having triangular-like shapes are rotated so that the bases of the pieces turn toward the front as explained in the above paragraphs, the bases (the leading edges) of the pieces are not aligned. Namely, some degree of disarrangement in the orientations of the pieces of the food dough having triangular-like shapes occur.

Thus, before conveying the pieces of the food dough to the winding apparatus, it is necessary to align the pieces so that the bases (the leading edges) of the pieces are aligned perpendicularly to the direction that the pieces are being conveyed.

In Patent Document 1, FIG. 1 shows stoppers (having no denotation) for aligning a plurality of pieces of food dough perpendicularly to the direction to convey the pieces. The stoppers can move up and down by their rotational movements and temporarily stop the movements of the pieces while causing the pieces to slip on the conveyor.

Namely, when the stoppers move down onto the conveyor by their rotational movements, the stoppers contact the pieces of the food dough that are conveyed by the conveyor, and then the stoppers move up by their rotational movements, and the stoppers are separated from the pieces.

For the configuration of Patent Document 1, there are the following problems: Namely, since the pieces of the food dough, which are conveyed at a certain speed by the conveyor, collide with the stoppers, which remain stationary in the direction for conveying the pieces, the pieces tend to be deformed. Further, when the stoppers move up by their rotational movements, the pieces of the food dough tend to be dragged on the conveyor by the stoppers because the pieces adhere to the stoppers. Particularly, when the speed of the conveyor increases in order to improve the productivity, the problems of the deformation of the pieces and an adhesive force between the pieces and the stoppers become serious.

The purpose of this invention is to solve the problems explained in the above paragraphs.

This invention relates to a method for aligning a plurality of columns of pieces of food dough that are conveyed downstream by a conveyor so that the leading edges of the pieces are aligned perpendicularly to the direction that the pieces of the food dough are conveyed, by using a plurality of aligning members corresponding to the columns of the pieces for aligning the pieces, wherein the aligning members can reciprocate in the direction to convey the pieces and move up from and down onto the conveyor, wherein while the aligning members are moving downstream at a lower speed than that of the conveyor, the respective aligning members contact the respective leading edges of the pieces of the columns, which pieces are conveyed by the conveyor, and then the aligning members move up and are separated from the pieces.

Further, this invention relates to an apparatus for aligning a plurality of columns of pieces of food dough that are conveyed downstream by a conveyor so that the leading edges of the pieces are aligned perpendicularly to the direction to convey the pieces of food dough, the apparatus comprising: aligning members for aligning the pieces by causing the pieces of the columns to contact the corresponding aligning members, a moving shaft for alignment having a plurality of aligning members arranged on lines, wherein the moving shaft for alignment can reciprocate in the direction to convey the pieces by the conveyor and can rotate about its axis or move up and down, a reciprocating means to move upstream and downstream the moving shaft for alignment in the direction that the pieces are conveyed so that when the moving shaft moves downstream, the shaft moves at a lower speed than that of the conveyor, and a driving means to rotate or to move up and down the moving shaft for alignment, wherein the plurality of aligning members move up and down by the rotational motion or the up and down movement of the driving means.

Further, the apparatus for aligning the pieces of the food dough further comprises a synchronizing means to synchronize the movement of the reciprocating means and that of the driving means, wherein the reciprocating means and the driving means are connected so as to move in synchronization with each other by means of the synchronizing means.

For the apparatus for aligning the pieces of the food dough, the reciprocating means comprises connecting rods, which are reciprocated by the rotation of eccentric cams attached to a rotating shaft, wherein the distal ends of the connecting rods are rotatably connected to the moving shaft for alignment.

Further, the driving means comprises up and down swinging levers, which levers are swung up and down by disk-like cams attached to a driven shaft, which shaft rotates in synchronization with the rotation of the rotating shaft, and a mechanism for changing the movement of the up and down swinging levers to the rotation of the moving shaft for alignment.

Effects of the Inventions

By these inventions explained in the above paragraphs, since while the aligning members are moving downstream at a lower speed than that of the conveyor they contact the leading edges of the pieces of the column to align the pieces, which pieces are conveyed by the conveyor, when the aligning members contact the pieces the relative speed of the aligning members in relation to the pieces of the food dough can be reduced.

Thus, the deformation of the pieces of the food dough and the adhesion between the aligning members and the pieces when the aligning members contact the pieces can be reduced. Further, the productivity of the apparatus for aligning the pieces of food dough can be improved by increasing the speed of the conveyor.

BRIEF DESCRIPTION OF THE DRAWINGS

FIG. 3 is a plane view of one embodiment of this invention of an apparatus for aligning a plurality of columns of pieces of food dough, which shows the entire constitution of the apparatus by an illustrative drawing.

FIG. 9 is a side view of an illustrative drawing to explain the operation of the aligning members.

DETAILED DESCRIPTION OF THE PREFERRED EMBODIMENT

Below, the embodiments of the present invention are explained based on figures. To facilitate understanding the invention, the embodiment of an apparatus for aligning pieces of food dough for croissants so that the leading edges of the pieces are aligned perpendicularly to the direction that the pieces of food dough are conveyed is explained.

The pieces of food dough are not limited to the croissants. The apparatus can treat the pieces of food dough having another shape, such as a rectangular or a round shape, which pieces are formed in advance.

Figure 1:
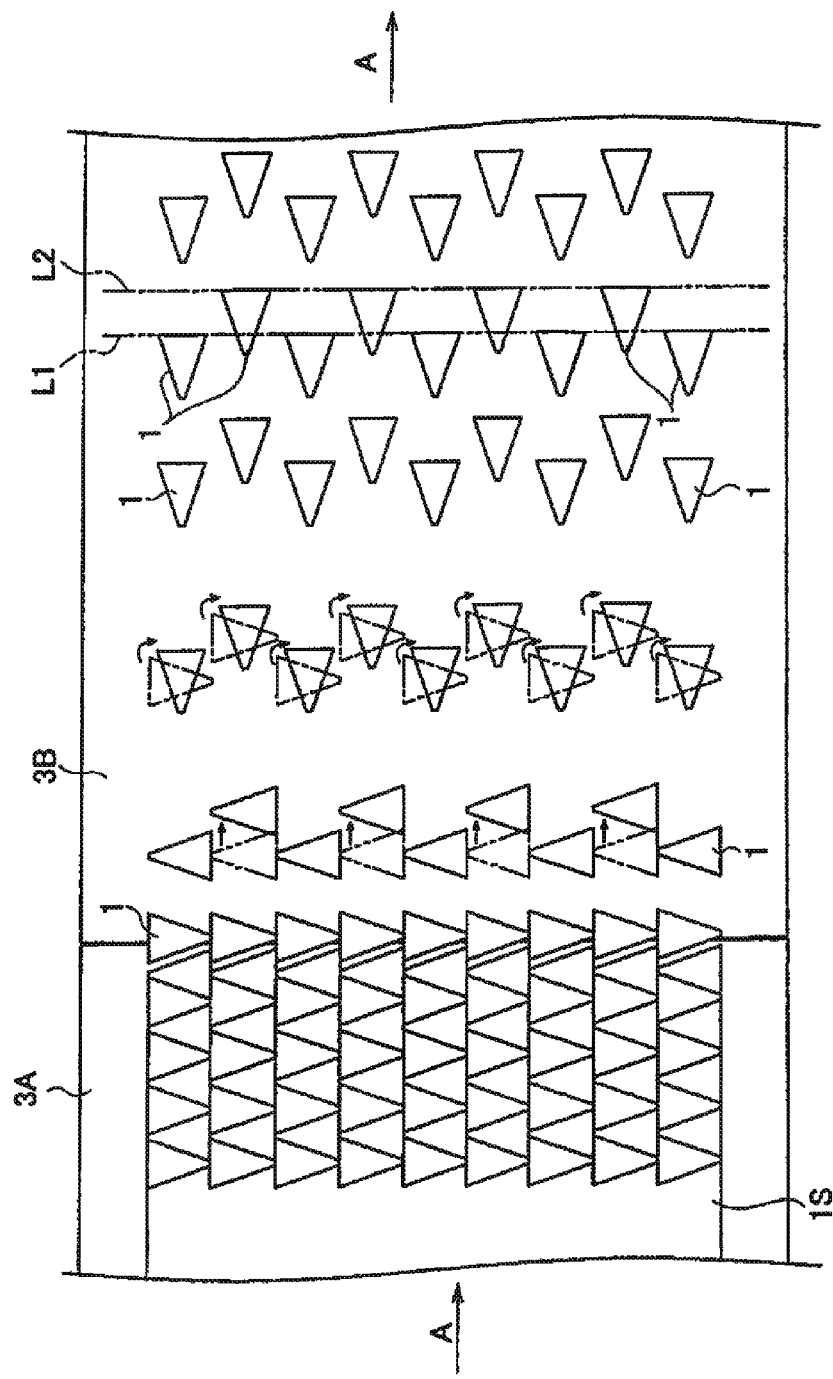
FIG. 1 is a plane view of an illustrative drawing to explain the movements of the food dough from when a sheet of food dough is cut into a plurality of pieces that are arranged in a plurality of columns and rows, to when the plurality of the pieces of food dough are aligned.
Figure 2:
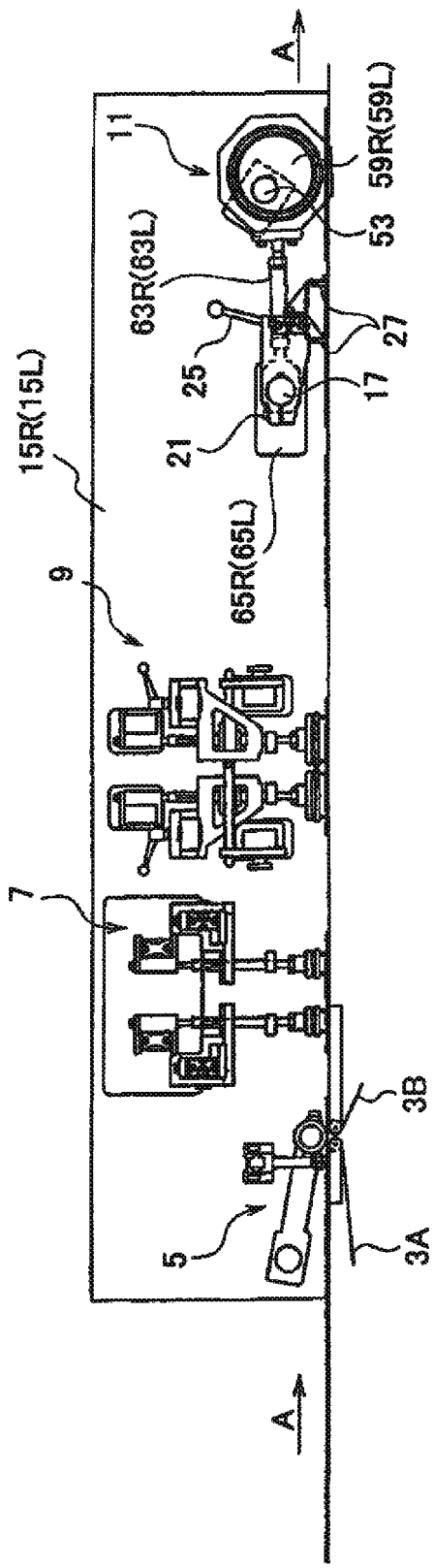
FIG. 2 is a plane view of an illustrative drawing to explain the layout of the main means used for an apparatus for aligning the plurality of pieces of food dough, which means correspond to the movements of the food dough of FIG. 1.
Figure 4:
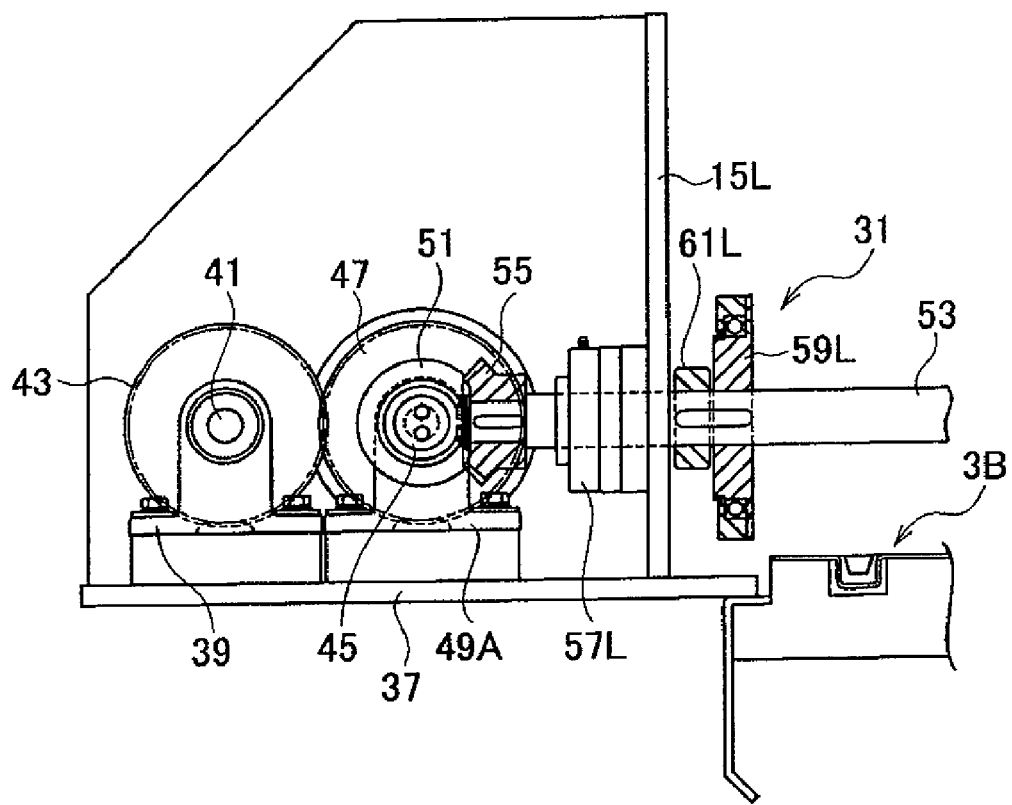
FIG. 4 is an elevational view showing a part of an interlocking mechanism connecting a driven shaft (interlocked to an input shaft) to a rotating shaft.

In referring to FIGS. 1 and 2, at the upstream side of a winding apparatus (not shown) to wind a plurality of pieces of food dough 1, which are cut from a sheet of food dough and have a triangular-like shape, so that pieces of food dough for croissants are formed, a first conveyor 3A is disposed. The conveyor 3A conveys a large sheet of food dough 1S toward its downstream side (the direction indicated by arrow A). A second conveyor 3B is disposed at the downstream side of the first conveyor 3A. The speed of the second conveyor 3B is a little greater than that of the first conveyor 3A. A rotary cutter (not shown) is disposed above the first conveyor 3A. The cutter sequentially cuts the sheet of the food dough 1S conveyed by the first conveyor 3A into triangular-like shaped pieces of food dough 1 that are arranged in a plurality of columns and rows.

A device 5 for separating pieces of food dough is disposed at the location between the first conveyor 3A and the second conveyor 3B. When the pieces of the food dough 1 that are arranged in a column elongated in the direction perpendicular to the direction for conveying the pieces are conveyed to the second conveyor 3B, the device 5 separates a plurality of pieces of food dough 1 from the sheet of the food dough 15. Since the device 5 is well known in this technical field, the explanation of the detail of the device 5 are omitted.

As shown in FIG. 1, at the location of the downstream side of the device 5 and the upstream side of the second conveyor 3B, a means 7 for rearranging the pieces of food dough in a staggered pattern is disposed. The pieces are separated from the sheet of food dough 15 and arranged in a column. As shown in FIG. 1, at the location of the downstream side of the means 7, a means 9 for rotating the pieces the food dough at 90 degrees is located so that the bases of the pieces having triangular-like shapes turn toward the front. Since the means 7 and the means 9 are well known in this technical field, the explanations of the details of them are omitted.

As explained in the above paragraphs, the plurality of pieces of food dough 1, which are cut from the sheet of the food dough 1S and are arranged in a column extending in the direction perpendicular to the direction for conveying the pieces by the first and the second conveyor 3A, 3B, are rearranged in a staggered pattern and are rotated so that the bases (the leading edges) of the pieces having triangular-like shapes turn toward the front. Thus, the bases of the pieces having triangular-like shapes are not always aligned on lines L1, L2 extending in the direction perpendicular to the direction for conveying the pieces by the conveyors.

Thus, when the plurality of pieces of food dough 1 are supplied to the winding apparatus, it is necessary to align them so that the bases (the leading edges) of the pieces are aligned on lines L1, L2 extending in the direction perpendicular to the direction for conveying the pieces by the conveyors. Thus, for this purpose, an apparatus 11 for aligning a plurality of pieces of food dough is disposed above the second conveyor 3B.

Particularly, as shown in FIG. 3, a frame 13 of the second conveyor 3B has a left and a right side structural member 15L, 15R. The ends of a moving shaft for alignment 17, which is elongated in the direction perpendicular to the direction (the direction indicated by arrow A) for conveying the pieces by the conveyors, are supported at the left and the right side structural member 15L, 15R. The moving shaft for alignment 17 can reciprocate in the direction of the conveyance of the second conveyor 3B and can rotate about its axis or move up and down. The proximal ends of a left and a right bracket 19L, 19R, which extend in the direction for conveying the pieces of food dough by the second conveyor 3B, are fixed to the ends of the moving shaft for alignment 17 by means of mechanical fasteners, such as bolts.

A supporting shaft 23 is elongated in the direction perpendicular to the direction for conveying the pieces, and is fixed to the distal ends of the left and the right bracket 19L, 19R by fixing means 25, such as a fixing lever, so that the supporting shaft 23 can be removed. A plurality of aligning members 27 are disposed at the supporting shaft 23. The plurality of aligning members 27 align the pieces of food dough 1 that are arranged in a staggered pattern and that are conveyed downstream, by causing the aligning members to contact the bases (the leading edges) of the pieces so that the pieces are aligned on the lines L1, L2. The plurality of aligning members 27 are fixed to the supporting shaft 23 in a staggered pattern so that the positions of them can be adjusted in the longitudinal direction. Particularly, the plurality of aligning members 27 are fixed to the supporting shaft 23 as follows:

Since an aligning member 27 that is directly fixed to the supporting shaft 23 and an aligning member 27 that is fixed to the supporting shaft 23 by means of a bracket 29 that protrudes from the shaft 23 are alternately disposed at the shaft 23, the plurality of aligning members 27 are arranged in a staggered pattern, as shown in FIG. 3.

To adjust the locations of the plurality of aligning members 27 in the longitudinal direction of the supporting shaft 23, for example, a groove having a proper shape, such as a slit or a T-shaped groove, is formed at the supporting shaft 23, and then the aligning members 27 and the brackets 29 are fixed to the supporting shaft 23 by means of mechanical fasteners, such as bolts passing through the slit, or by means of mechanical fasteners, such as T-shaped bolts or T-shaped nuts engaged with the groove so that the positions of the mechanical fasteners can be adjusted.

Further, to adapt to the number of columns of the pieces of food dough 1 or the distance between the pieces, another type of supporting shaft 23, which has a plurality of aligning members 27 corresponding to the arrangement of the pieces of food dough 1, can be attached to the left and the right bracket 19L, 19R. Thus, the parts of the apparatus can be effectively and quickly replaced.

As explained in the above paragraphs, the moving shaft for alignment 17 and the supporting shaft 23 are explained as a different subassembly. However, they can be considered to be an integrated assembly, because they are assembled by means of the left and the right bracket 19L, 19R.

As explained in the above paragraphs, the pieces of food dough 1, which are cut into the pieces of a plurality of columns and are arranged in a staggered pattern, and which are conveyed downstream by the second conveyor 3B, can be aligned on the lines L1, L2 extending in the direction perpendicular to the direction for conveying the pieces by the second conveyor 3B, by causing the leading edges (the bases) of the pieces to contact the plurality of aligning members 27 arranged in a staggered pattern.

When the aligning members 27 contact the pieces of food dough 1 to align the pieces, the aligning members 27 contact the pieces of food dough 1 while the aligning members 27 are moving in the same direction as that for conveying the pieces of food dough 1 by the second conveyor 3B. Thus, the apparatus 11 for aligning the pieces of food dough comprises a reciprocating means 31 to move the moving shaft for alignment 17 in the direction for conveying the pieces and a driving means 33 to rotate or move up and down the moving shaft for alignment 17, to move up and down the aligning members 27. The apparatus 11 for aligning the pieces of food dough further comprises a synchronizing means 35 to synchronize the movement of the reciprocating means 31 and that of the driving means 33. Namely, the reciprocating means 31 and the driving means 33 are connected so that they can move in synchronization with each other.

Particularly, one end of an input shaft 41 is rotatably supported at a plate-like-shaped base member 37 by means of a bearing 39. The base member 37 is attached to and integrated with the left side structural member 15L of the frame 13 of the second conveyor 3B. The other end of the input shaft 41 is connected to a motor (not shown) that drives the second conveyor 3B by means of a proper power transmission (not shown), to be driven in synchronization with the second conveyor 3B. Namely, the input shaft 41 is rotated in synchronization with the movement of the second conveyor 3B. Thus, if the speed of the second conveyor 3B increases, the rotational speed of the input shaft 41 would increase in proportion to the speed of the second conveyor 3B.

To control the speed of the input shaft 41 so that it rotates in synchronization with the movement of the second conveyor 3B, it is possible, for example, for the input shaft 41 to be connected to another motor, such as a servo motor, which motor is different from the motor that drives the second conveyor 3B, and that the motor for driving the input shaft 41 be controlled so as to be synchronized with the motor for driving the second conveyor 3B.

A gear 43, acting as a means for transmitting a rotational movement, is attached to and integrated with the input shaft 41. The gear 43 engages a driven gear 47 attached to a driven shaft 45. The driven shaft 45 is disposed so as to extend in the direction parallel to the direction of the movement of the second conveyor 3B. The portions near two ends of the driven shaft 45 are rotatably supported by bearings 49A, 49B disposed on the base member 37. A bevel gear 51 attached to one end of the driven shaft 45, which gear 51 acts as a means for transmitting a rotational movement, engages a bevel gear 55 attached to one end of a rotating shaft 53.

Thus, since the rotating shaft 53 is interlocked with the driven shaft 45, the rotating shaft 53 rotates in synchronization with the rotation of the driven shaft 45.

The rotating shaft 53 corresponds to an element of a reciprocating means 31. The rotating shaft 53 is elongated in the direction perpendicular to the direction for conveying the pieces by the second conveyor 3B. The portions near the two ends of the rotating shaft 53 are rotatably supported by bearings 57L, 57R disposed on the left and the right side structural member 15L, 15R of the frame 13 of the second conveyor 3B. Eccentric cams 59L, 59R are attached to and integrated with the portions near the two ends of the rotating shaft 53 by means of a key, etc. The portions that the eccentric cams 59L, 59R are attached to are located at the inner sides of the left and the right side structural member 15L, 15R, which inner sides face the centerline of the second conveyor 3B. Balancers 61L, 61R are attached near the portions of the rotating shaft 53 that the eccentric cams 59L, 59R are attached to so that the centers of gravity of the balancers 61L, 61R are located at the position opposite the centers of gravity of the eccentric cams 59L, 59R. Thus, when the rotating shaft 53 rotates together with the eccentric cams 59L, 59R and the balancers 61L, 61R, the eccentric load caused by the eccentric cams 59L, 59R and that caused by the balancers 61L, 61R cancel each other. Thus, the vibrations caused by the rotation of the eccentric cams 59L, 59R can be reduced by the balancers 61L, 61R.

The proximal ends of a left and a right connecting rod 63L, 63R are rotatably connected to the eccentric cams 59L, 59R by means of bearings 62L, 62R. The distal ends of the left and the right connecting rod 63L, 63R are rotatably connected to the moving shaft for alignment 17. Thus, when the rotating shaft 53 is rotated, the left and the right connecting rod 63L, 63R reciprocate in the direction for conveying the pieces of food dough 1 by the second conveyor 3B (in the vertical direction in FIG. 3) by means of the eccentric cams 59L, 59R. Thus, the moving shaft for alignment 17 and the aligning members 27 reciprocate in the same direction as that of the connecting rods 63L, 63R, by means of the rods.

Figure 5:
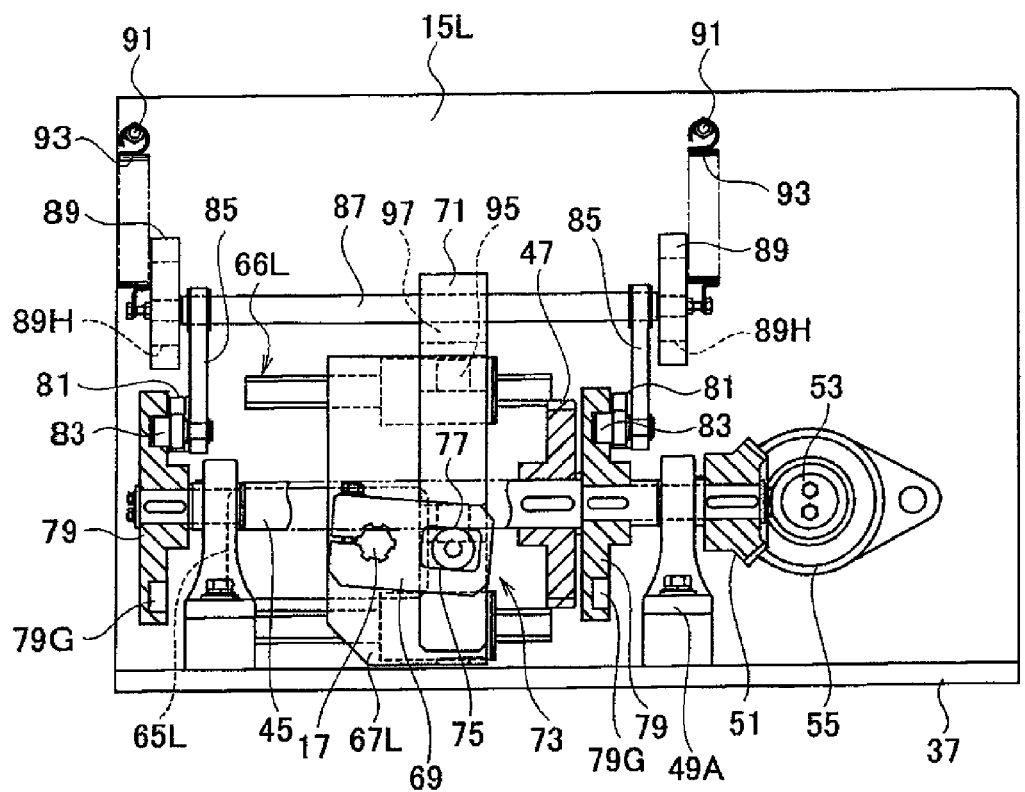
FIG. 5 is a side view showing the constitution of a mechanism for changing a movement. The mechanism changes the up and down movement of an up and down moving member to the rotational movement of the moving shaft for alignment.

Large openings 65L, 65R are formed at the left and the right side structural member 15L, 15R so that the moving shaft for alignment 17 can move in the direction for conveying the pieces of food dough 1. The two ends of the moving shaft for alignment 17 are disposed through the large openings 65L, 65R. Two pairs of linear guide mechanisms 66L, 66R are disposed at the left and the right side structural member 15L, 15R, respectively. One of the pair of linear guide mechanisms is disposed at the upper portion of the side structural member and the other of the pair of linear guide mechanisms is disposed at the lower portion of the side structural member. Sliders 67L, 67R are attached to the two pairs of linear guide mechanisms 66L, 66R, respectively. The two ends of the moving shaft for alignment 17 are rotatably supported by the sliders 67L, 67R, respectively. As shown in FIG. 5, to rotate the moving shaft for alignment 17 about its axis, a lever 69 for rotating a shaft is attached to and integrated with the left end of the moving shaft for alignment 17. The lever 69 for rotating a shaft acts as an element of a mechanism 73 for changing the movement of an up and down moving member 71 to a rotational movement of the moving shaft for alignment 17.

An elongated hole 75 is formed at the lever 69 for rotating a shaft. A rolling member 77, such as a roller, which member 77 is disposed on the up and down moving member 71, is engaged with the elongated hole 75. Thus, when the up and down moving member 71 moves up and down, the moving shaft for alignment 17 rotates about its axis. Thus, the plurality of aligning members 27, which are fixed to the moving shaft for alignment 17, move up from and down onto the upper surface of the second conveyor 3B.

Figure 6:
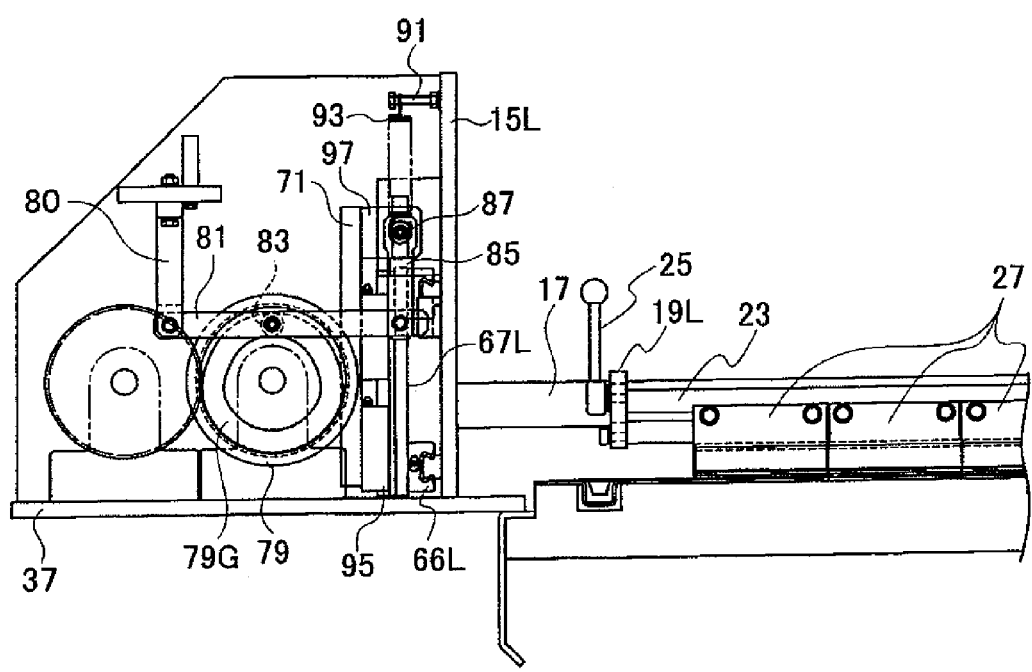
FIG. 6 is an elevational view showing a part of a mechanism for moving the up and down moving member.
Figure 7:
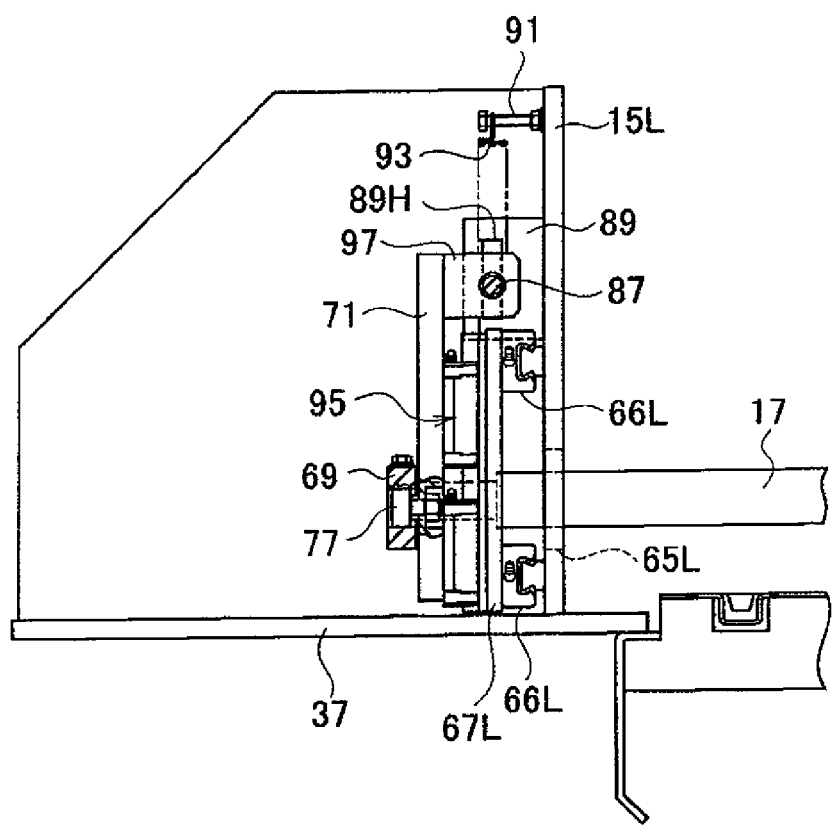
FIG. 7 is an elevational and sectional view showing a part of a mechanism for rotating the moving shaft for alignment by the up and down moving member.

To move the up and down moving member 71 up and down, a pair of disk-like cams 79, 79 are attached to and integrated with the driven shaft 45 (interlocked to the input shaft 41). Each of the pair of disk-like cams 79, 79 has a groove 79G. Each groove 79G, 79G of the pair of disk-like cams 79, 79 is engaged with a cam follower 83 disposed at the middle portion of up and down swinging levers 81, 81 (see FIG. 6). The proximal ends of each up and down swinging lever 81, 81 are swingably supported by a supporting bracket 80, which is attached to and integrated with the base member 37 and the left side structural member 15L. The distal ends of each up and down swinging lever 81 are rotatably connected to the lower ends of a pair of up and down moving links 85.

Two ends of a guide bar 87 that are elongated in the direction for conveying the pieces of food dough 1 are supported by the upper portions of the pair of up and down moving links 85, 85. The two ends of the guide bar 87 pass through guide holes 89H, 89H of guide plates 89, 89 attached to the left side structural member 15L so that the guide bar 87 can move up and down. Balance springs 93, 93 are disposed between the two ends of a guide bar 87 and hooks 91, 91 disposed on the left side structural member 15L.

The up and down moving member 71 is supported by means of a linear guide mechanism 95 disposed at the slider 67L so that the up and down moving member 71 can move up and down. A sliding bracket 97 that is attached to the upper portion of the up and down moving member 71 is supported by the guide bar 87 so that the sliding bracket 97 can freely slide along the guide bar 87.

Thus, when the driven shaft 45 (interlocked with the input shaft 41) is rotated and when the pair of disk-like cams 79, 79 are rotated, the guide bar 87 moves up and down by means of the up and down swinging levers 81, 81 and the up and down moving links 85, 85. The up and down moving member 71 moves up and down in synchronization with the movement of the guide bar 87. Thus, the lever 69 for rotating a shaft swings up and down by means of the rolling member 77 disposed on the up and down moving member 71. Thus, the moving shaft for alignment 17 rotates about its axis. When the moving shaft for alignment 17 moves in the direction for conveying the pieces of food dough 1 by being guided by means of the linear guide mechanisms 66L, 66R, the up and down moving member 71 moves in the direction for conveying the pieces of food dough 1 along the guide bar 87.

Next, the operations of the apparatus for aligning pieces of food dough 1 are explained.

As shown in FIG. 1, a sheet of food dough 1S is conveyed by the first conveyor 3A toward its downstream side (the direction indicated by arrow A). When the sheet of food dough 1S reaches where the rotary cutter (not shown) is disposed, the sheet of food dough 1S is cut into triangular-like shaped pieces of food dough 1 that are arranged in a plurality of columns and rows. When the pieces of the food dough 1 arranged in a column are transferred from the first conveyor 3A to the second conveyor 3B, the pieces of the food dough 1 arranged in a column are separated from the sheet of food dough 1S by the device 5 for separating the pieces of the food dough 1.

When the pieces of the food dough 1 that are arranged in a column reach where the means 7 for rearranging the pieces of food dough in a staggered pattern is disposed, the pieces of the food dough 1 are rearranged in a staggered pattern by the means 7. Then, the pieces of the food dough 1 that are rearranged in a staggered pattern are rotated where the means 9 for rotating the pieces of the food dough is disposed, so that the bases of the pieces having triangular-like shapes turn toward the front.

After the pieces of the food dough 1 are rearranged in a staggered pattern and are rotated so that the bases of the pieces turn toward the front, when the pieces of the food dough 1 reach where the apparatus 11 for aligning the pieces of the food dough is disposed, the leading edges (the bases) of the pieces of the food dough 1 are aligned on lines L1, L2 extending in the direction perpendicular to the direction for conveying the pieces.

Namely, as explained in the above paragraphs, when the input shaft 41 is rotated in synchronization with the movement of the second conveyor 3B, the driven shaft 45 (interlocked with the input shaft 41) and the rotating shaft 53 are rotated in synchronization with each other.

Figure 8:
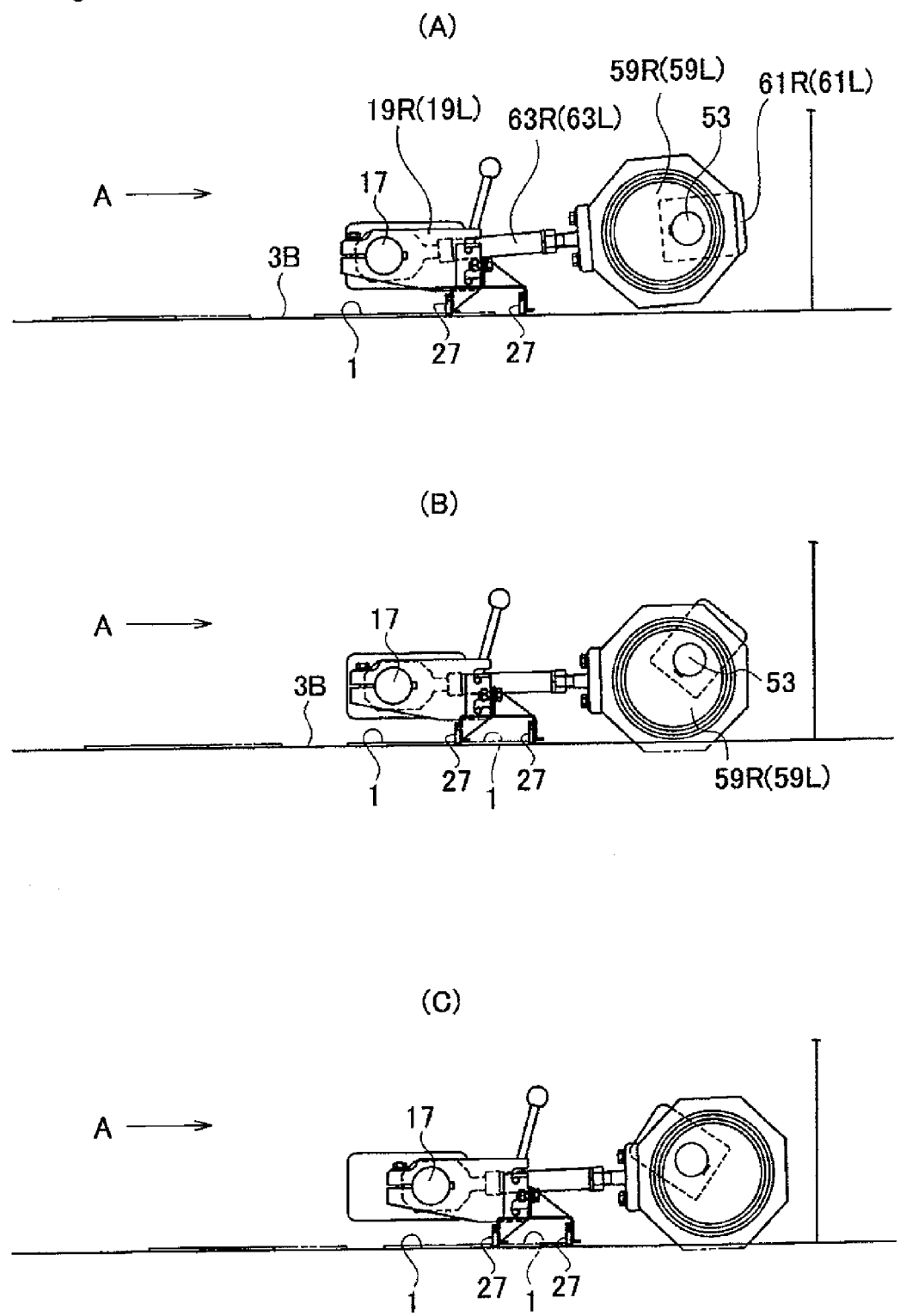
FIG. 8 is a side view of an illustrative drawing to explain the operation of the aligning members.

As shown in FIG. 8(A), at the initial state of the rotating shaft 53, the centers of the eccentric cams 59L, 59R attached to the rotating shaft 53 are located at the extreme upstream side in the direction for conveying the pieces (namely, the distance between the axis of the moving shaft for alignment 17 and that of the rotating shaft 53 is at its maximum). Then, since the up and down moving member 71 is located at the lower position, the moving shaft for alignment 17 is rotated clockwise (see FIG. 8(A)), and the aligning members 27 are lowered onto the upper surface of the second conveyor 3B. Thus, as shown in FIG. 8(A), when the rotating shaft 53 is rotated further clockwise in synchronization with the movement of the second conveyor 3B, the moving shaft for alignment 17 and the aligning members 27 move downstream in the direction for conveying the pieces.

Since the speed of the downstream movement of the moving shaft for alignment 17 and the aligning members 27 is less than that of the second conveyor 3B, the pieces of the food dough 1 conveyed by the second conveyor catch up to and contact the aligning members 27 (see FIG. 8(B)). Then, the pieces of the food dough 1 are prevented from being conveyed at a high speed (equal to the speed of the second conveyor 3B). Thus, the pieces of the food dough 1 are conveyed downstream together with the aligning members 27 while the pieces are slipping on the conveyor 3B.

As explained in the above paragraphs, when the leading edges (the bases) of the pieces of the food dough 1 contact the plurality of aligning members 27, the leading edges of the plurality of the pieces are aligned on lines L1, L2 extending in the direction perpendicular to the direction for conveying the pieces. Then, when the driven shaft 45 (interlocked with the input shaft 41) and the rotating shaft 53 are further rotated in synchronization with each other, since the up and down swinging levers 81, 81 are swung upward by means of the disk-like cams 79, 79, the guide bar 87 and the up and down moving member 71 ascend upward.

As shown in FIG. 5, when the up and down moving member 71 ascend upward, the moving shaft for alignment 17 is rotated counterclockwise by means of the rolling member 77 and the lever 69 for rotating a shaft. Thus, the plurality of the aligning members 27 ascend upward from the upper surface of the second conveyor 3B (see FIG. 9(a)). Thus, the plurality of the pieces of the food dough begin to move downstream at a high speed while the arrangement of the pieces, of which the leading edges (the bases) are aligned on the lines L1, L2, is maintained. After the aligned pieces of the food dough 1 pass under the aligning members 27, then when the driven shaft 45 (interlocked to the input shaft 41) and the rotating shaft 53 further rotate they return to the initial state (see FIG. 9(B)).

As explained in the above paragraphs, when the pieces of the food dough 1, which are conveyed by the second conveyor 3B at a high speed, contact the aligning members 27, the aligning members 27 are moving downstream at a speed less than that of the conveyor 3B. Thus, since the relative speed of the aligning members 27 in relation to the pieces of the food dough 1 is low, the deformation to and impacts on the pieces, when the pieces contact the aligning members 27, can be reduced. Further, the adhesion between the aligning members and the pieces when the pieces contact the aligning members can be reduced. Thus, the apparatus for aligning pieces of food dough 1 of this invention can solve the problem previously mentioned and can improve the productivity by increasing the speed for conveying the pieces of the food dough 1.

This invention is not limited to the embodiment explained in the above paragraphs. Many kinds of modifications can be applied to the embodiment, and these variations are all included within the scope of this invention.

For example, the aligning members 27 can be moved up and down by moving the moving shaft for alignment 17 directly up and down by means of the up and down moving member 71.

Further, the moving shaft for alignment 17 can be driven by the rotation of a servo motor or the movement of a linear motor so that the moving shaft 17 can reciprocate in the direction of the conveyance of the conveyor. Then, the moving shaft for alignment 17 can be rotated by means of a servo motor, the rotation of which can be controlled in synchronization with the movement of the moving shaft for alignment 17 reciprocating in the direction of the conveyance of the conveyor.

In the above paragraphs, it is explained that the pieces of the food dough 1 that are arranged in a staggered pattern are aligned in a staggered pattern. Namely, the pieces of the food dough 1 that are arranged in two columns are simultaneously aligned. However, the pieces of the food dough 1 arranged in one column or three or more columns may also be simultaneously aligned.

The pieces of the food dough 1 may be not only the pieces that are cut and separated from the sheet of the food dough, but also, for example, a plurality of thin disk-like pieces of food dough arranged in a column. They are formed by rolling dough for pizzas having a semispherical shape.

In this case, when the pieces of the food dough 1 contact to the aligning members, the adhesion between the aligning members and the pieces can also be reduced. Thus, this invention can improve the productivity of the apparatus for aligning pieces of food dough 1.

Incidentally, when round pieces of food dough are aligned by the apparatus of this invention, the portions of the aligning members contacting the pieces may be made so as to have a circular shape or a V-like-shape so that the portions of the aligning members contact the pieces at two points.

Explanation of Denotations 1 food dough
1S a sheet of food dough
3A a first conveyor
3B a second conveyor
11 an apparatus for aligning pieces of food dough
17 a moving shaft for alignment
27 aligning members
31 a reciprocating means to move the moving shaft for alignment
33 a driving means to rotate or move up and down the moving shaft for alignment
35 a synchronizing means to synchronize the movement of the reciprocating means and that of the driving means
37 a base member
41 an input shaft
45 a driven shaft (interlocked with an input shaft)
53 a rotating shaft
59L, 59R an eccentric cam
63L, 63R a connecting rod
66L, 66R a linear guide mechanism
67L, 67R a slider
69 a lever for rotating a shaft
71 an up and down moving member
73 a mechanism for changing a movement
79 a disk-like cam
81 an up and down swinging lever
83 a cam follower
85 a supporting link
95 a linear guide mechanism
97 a sliding bracket

What we claim is:

1. A method for aligning a plurality of columns of pieces of food dough that are conveyed downstream by a conveyor so that the leading edges of the pieces are aligned on a line perpendicular to a direction that the pieces of food dough are conveyed, by using a plurality of aligning members corresponding to the columns of the pieces for aligning the pieces, wherein the aligning members can reciprocate in the direction to convey the pieces and move up from and down onto the conveyor, wherein while the aligning members are moving downstream at a lower speed than that of the conveyor, the respective aligning members contact the respective leading edges of the pieces of the columns, which pieces are conveyed by the conveyor, the aligning members moving downstream at a speed that is relatively low in comparison with the speed of the pieces of food dough that are in contact with the aligning member such that adhesion between the aligning members and the pieces contacting the aligning members is reduced and then the aligning members move up and are separated from the pieces.

2. An apparatus for aligning a plurality of columns of pieces of food dough that are conveyed downstream by a conveyor so that the leading edges of the pieces are aligned perpendicularly to a direction that the pieces of food dough are conveyed, the apparatus comprising:

aligning members for aligning the pieces by causing the pieces of the columns to contact the corresponding aligning members, a moving shaft for alignment having a plurality of aligning members, wherein the moving shaft for alignment can reciprocate in the direction to convey the pieces by the conveyor and can rotate about its axis or move up and down, a reciprocating means to move the moving shaft for alignment upstream and downstream in the direction that the pieces are conveyed so that when the moving shaft moves downstream, the shaft moves at a lower speed than that of the conveyor, and a driving means to rotate or to move up and down the moving shaft for alignment, wherein the plurality of aligning members move up and down by the rotational motion or the up and down movement of the driving means.

3. The apparatus for aligning the pieces of the food dough of claim 2, wherein it further comprises a synchronizing means to synchronize the movement of the reciprocating means and that of the driving means, wherein the reciprocating means and the driving means are connected so as to move in synchronization with each other by means of the synchronizing means.

4. The apparatus for aligning the pieces of the food dough of claim 2, wherein the reciprocating means comprises connecting rods that are reciprocated by the rotation of eccentric cams attached to a rotating shaft, wherein the distal ends of the connecting rods are rotatably connected to the moving shaft for alignment, and wherein the driving means comprises up and down swinging levers, which levers are swung up and down by disk-like cams attached to a driven shaft, which shaft rotates in synchronization with the rotation of the rotating shaft, and a mechanism for changing the movement of the up and down swinging levers to the rotation of the moving shaft for alignment.

5. The apparatus for aligning the pieces of the food dough of claim 3, wherein the reciprocating means comprises connecting rods that are reciprocated by the rotation of eccentric cams attached to a rotating shaft, wherein the distal ends of the connecting rods are rotatably connected to the moving shaft for alignment, and wherein the driving means comprises up and down swinging levers, which levers are swung up and down by disk-like cams attached to a driven shaft, which shaft rotates in synchronization with the rotation of the rotating shaft, and a mechanism for changing the movement of the up and down swinging levers to the rotation of the moving shaft for alignment.

* * * * *